United States Patent
Gupta et al.

(10) Patent No.: US 9,465,678 B2
(45) Date of Patent: Oct. 11, 2016

(54) EVENT CORRELATION

(71) Applicant: HEWLETT-PACKARD DEVELOPMENT COMPANY, L.P., Houston, TX (US)

(72) Inventors: Chetan Kumar Gupta, San Mateo, CA (US); Craig Peter Sayers, Menlo Park, CA (US); Umeshwar Dayal, Saratoga, CA (US); Krishnamurthy Viswanathan, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/418,307

(22) PCT Filed: Oct. 25, 2012

(86) PCT No.: PCT/US2012/061935
§ 371 (c)(1),
(2) Date: Jan. 29, 2015

(87) PCT Pub. No.: WO2014/065804
PCT Pub. Date: May 1, 2014

(65) Prior Publication Data
US 2015/0205647 A1    Jul. 23, 2015

(51) Int. Cl.
G06F 9/54    (2006.01)
G06F 11/00   (2006.01)
G06F 9/44    (2006.01)

(52) U.S. Cl.
CPC ............ G06F 9/542 (2013.01); G06F 9/4421 (2013.01); G06F 11/008 (2013.01); *G06F 2201/86* (2013.01)

(58) Field of Classification Search
CPC .... G06F 9/542; G06F 9/4421; G06F 11/008; G06F 2201/86
See application file for complete search history.

(56) References Cited

U.S. PATENT DOCUMENTS

| | | |
|---|---|---|
| 5,748,098 A | 5/1998 | Grace |
| 6,868,367 B2 | 3/2005 | Yemini et al. |
| 8,065,257 B2 | 11/2011 | Kuecuekyan |
| 2005/0283337 A1* | 12/2005 | Sayal ............. G06Q 10/00 702/179 |
| 2006/0229925 A1 | 10/2006 | Chalasani et al. |
| 2009/0171704 A1 | 7/2009 | Bobak |
| 2009/0183023 A1 | 7/2009 | Rathunde et al. |
| 2009/0262650 A1 | 10/2009 | Shaikh et al. |
| 2012/0075450 A1 | 3/2012 | Ding et al. |
| 2013/0151694 A1* | 6/2013 | Bleakley ............. G06Q 10/00 709/224 |
| 2013/0290232 A1* | 10/2013 | Tsytsarau ........... G06N 99/005 706/46 |

OTHER PUBLICATIONS

Mehmet Sayal, Detecting time correlation in time-series data streams, Jun. 9, 2004 pp. 1-10.*
International Search Report and Written Opinion of the International Searching Authority, mailed Apr. 29, 2013, issued in related PCT Application No. PCT/US2012/061935.
"Big Data, How to Detect Relationships Between Categorical Variables"; http://www.statsoft.com/textbook/association-rules/.
Jayaprakash, A.; "StreamCruncher"; Nov. 3, 2007; http://www.streamcruncher.com.
Teufl, P. et al, "Event Correlation on the Basis of Activation Patterns", Feb. 19, 2010.

* cited by examiner

*Primary Examiner* — Syed Roni
(74) *Attorney, Agent, or Firm* — Fabian VanCott (57) ABSTRACT

A method for event correlation includes capturing events and arranging the events sequentially in at least one dimension. An event correlator implemented by a computational device convolves a kernel density function with each of the events to produce a convolved function for each event. Co-occurrences between events are found by calculating overlap between convolved functions.

15 Claims, 6 Drawing Sheets

EVENT CORRELATION

BACKGROUND

Event correlation is a technique for analyzing events in event streams to discover which events are most significant. Event correlation can be used in telecommunication, process control, network/systems management, business activity monitoring, managing security events, social media analysis and other systems. By using an automated event correlator to filter out less significant events, find correlations/trends between events, and rate the importance of events, action can be taken to address the most meaningful events. Where human review is desired, the event correlator can make timely and effective decisions about which events and relationships between events should be presented to the operator.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Event correlation can be applied to a wide variety of systems. Many physical and software systems issue events such as alarm, warning, error reports, and other events. To make sense of a large number of events, event correlation techniques can be used. However, event correlation techniques are typically implemented by dividing an event stream or streams into windowed segments. Events that occur together in one time window are considered to have co-occurred. This leads to imprecision, arbitrary pairing of events, and in some cases excessive computation.

The term "window" as related to an event stream describes a bounded segment of events in the event stream. The window may be defined by a specific time interval, pointers, or other designators. The nature of the window may be static or dynamic. For example, a sliding window is dynamic in the sense that it moves across the event stream and includes different events at different times. In another example, an event driven window has boundaries that are determined by the events in the event stream. For example, an event driven window may be defined by a pattern query. Events that satisfy the pattern query constraints are defined as being inside the window and events that do not are outside of the window.

Suppose an event stream includes time line of events from time T=0 to time T=3600 minutes. A time window is selected either arbitrarily, experimentally, or using calculation. For example, the time window may have a duration of 30 minutes. Then all events that occur within time 0 . . . 30 are considered to have co-occurred, all events that occur in the time 30 . . . 60, are considered to have co-occurred, and so on. In some instances, the window is moved incrementally. For example, the first window is 0 . . . 30, the second window is 15 . . . 45, and so on. This type of windowing technique is known as a "sliding window." Once the event streams have been divided into these sets, market basket analysis can be used to obtain event correlations. However, these sets may mask relationships/correlations between events that occur within the same window.

Another related approach is to have a time window around every event occurrence. All events that occur in that window would be considered to have co-occurred. After this division, significant co-occurrences could be found. This approach can be more precise than the previous technique, but can be significantly more computationally expensive.

To summarize, windowed correlation techniques are constructed around the notion of a time window, where co-occurrence is when two events occur in the same window. There are a number of variations on this windowed approach, but all share the limitation of determining co-occurrence based on events falling within a window.

The event correlation principles described below are not dependent on time windowing and consequently do not have the limitations of windowing techniques. In general, the principles described below include replacing each occurrence of an event with a mathematical function such that area under the curve produced by the function is 1. The events can now be compared using these curves rather than specific points in time. This leads to a number of advantages, including the ability to quantify an amount of co-occurrence by looking for overlap between two curves. Thus co-occurrence can be defined as common area under two overlapping functions that represent different events.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
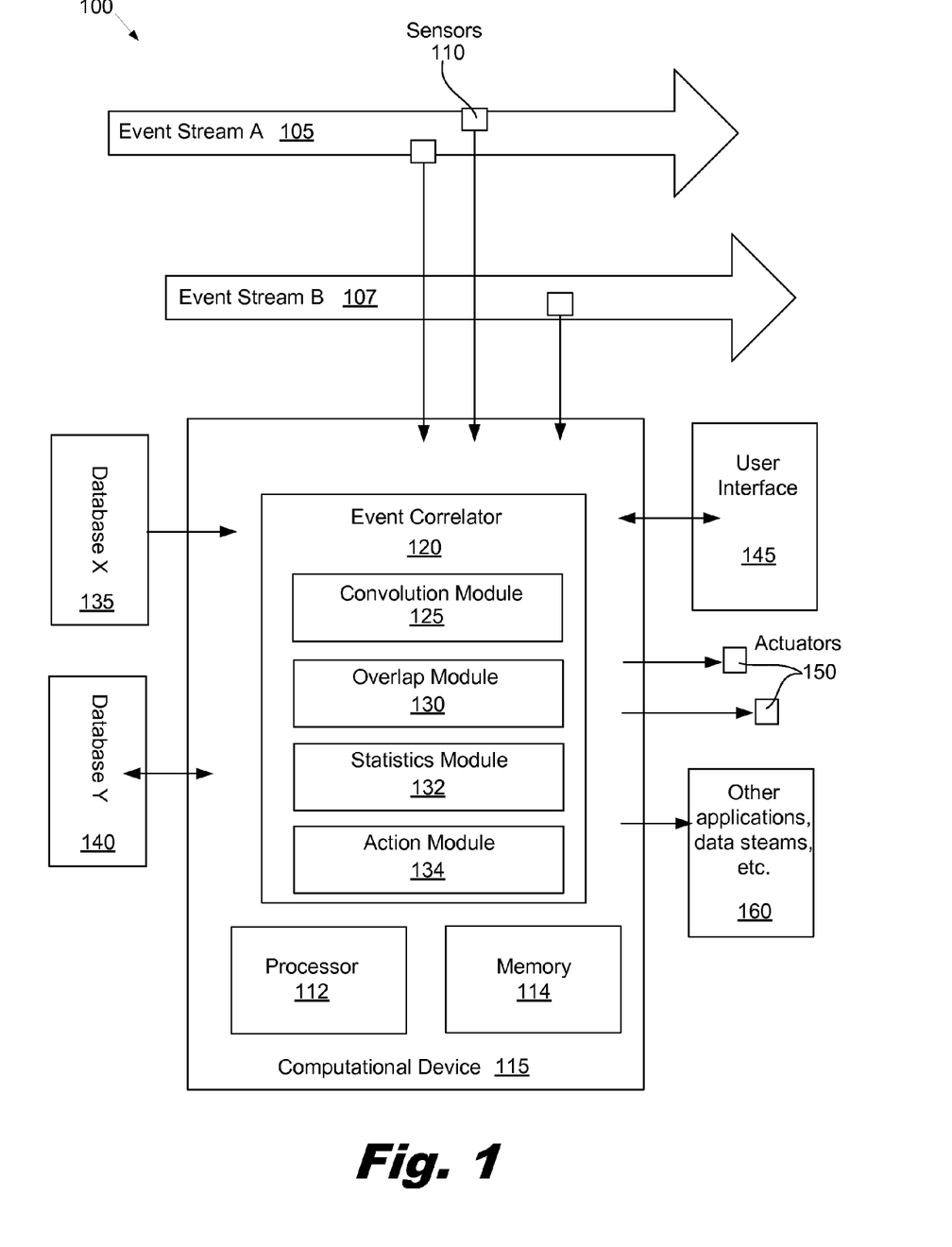
FIG. 1 is a block diagram of an event correlator, according to one example of principles described herein.

FIG. 1 is a block diagram of a system (100) for event correlation. Event streams (105, 107) are an ordered sequence of events that can be monitored by an event correlator (120). Event streams may be bounded by a certain time interval or other criteria (content, space, source) or may be open-ended and unbounded. The event stream may be ordered according to the time events occur or according to other characteristics of the data. An event stream may contain events of many different types. These events may be defined by a change of state within a physical or logical condition, with the change of state information including a time stamp defining the order of occurrence and a topology mark defining the location of the occurrence.

Sensors (also known as "event extractors") (110) in the event streams (105, 107) extract events for consumption by the event correlator (120). In general, event streams may include both simple and complex events. Simple events that are directly extracted from event streams and represent a native action of the system(s) that is being monitored. A complex event may be a "derived" event because the complex event may convey additional information that was not present in any of the events that gave rise to it. A complex event in one application may be viewed as a simple event in another application. As used below, the term "event" includes both simple events and complex events.

This event data is fed into the event correlator (120). A computational device (115) hosts the event correlator (120) by executing its instructions. The computational device (115) includes a processor (112) and memory (114), and a number of other components such as input/output interfaces. The event correlator (120) can monitor multiple event streams simultaneously and maintain a record of past events extracted from the event streams. These event records can be maintained in stacks or archived in databases (135, 140) for later retrieval.

The event correlator (120) includes a number of modules, including a convolution module (125), an overlap module (130), a statistics module (132) and an action module (134). The event correlator accepts events from the event streams and evaluates them using the various modules (125, 130, 132, 134). The results of these evaluations can be used in a number of ways. For example, the results can be written to a database (135, 140), output to a user interface (145), used to control actuators (150), or entered into other applications, data streams, or engines (160).

In general, event correlation is a term that is widely used to describe a large set of techniques, such as filtering, event suppression, and other concepts. In the discussion below, event correlation is defined as finding "significant co-occurrence" relationship between event types over the time dimension. An event occurrence e, is usually specified by the tuple $\{e_{i,c}, e_{i,t}\}$ where $e_{i,c}$ is the event type (or class) and $e_{i,t}$ is the time of occurrence of the event. A "significant co-occurrence" between events usually means that one or more events with the same or different event type co-occur in time. For example, suppose very often when event $E_A$ occurs, the event $E_B$ occurs within 5 minutes of the occurrence of $E_A$. Thus, it can be determined that $E_A$ and $E_B$ frequently co-occur and this co-occurrence could be significant. The principles described below provide for identification of these co-occurrences. Additionally, the principles provide for discovery of co-occurrences of arbitrary size, meaning co-occurrences that involve multiple (greater than or equal to 2) event types. Additionally, the principles set forth provide for discovery in not just time, but on location (space) as well as space time or any other arbitrary set of dimensions. In which case an event occurrence e, is specified by the tuple $\{e_{i,c}, e_{i,s}\}$ where $e_{i,c}$ is the event type (or class) and is the arbitrary point in space of occurrence of the event. For ease of illustration we will explain our technique with the example of events occurring on time lines. The result of finding significant co-occurrences is either:

(i) A set of events that occur together. For example, $\{E_A, E_B, E_C\}$ implies that Event Types A, B, C occur together with some significant probability.

(ii) Or, a rule with a left hand side (LHS) and a right hand side (RHS). For example, $\{E_A \rightarrow, E_B\}$ is a rule that states that Event Type A occurrence implies Event Type B occurrence with some significant probability.

Figure 2A:
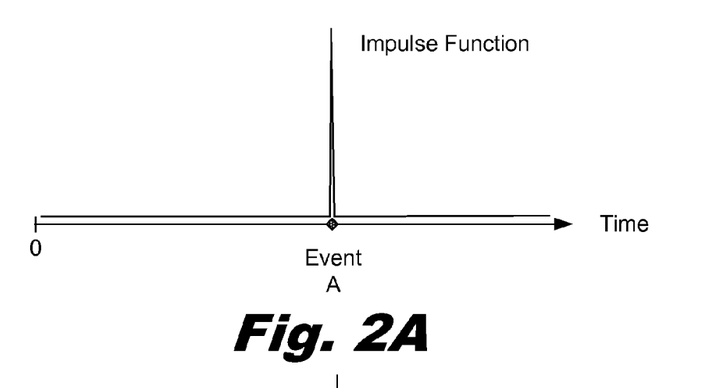
FIGS. 2A-2C are graphs of an event, various kernel density functions, and the convolution of the event with a kernel function, according to one example of principles described herein.
Figure 2B:
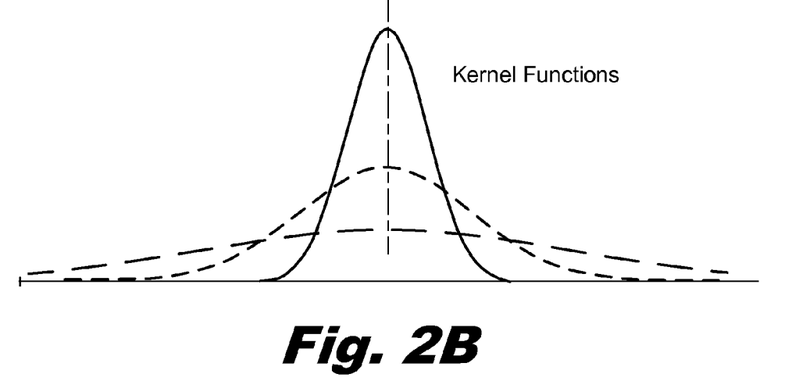

FIG. 2A is a time line of an event stream with a single event A shown on the line. As discussed above, event A would typically be included in a time window and other events on other time lines that fell into the same time window would be considered to co-occurring. However, in this example, the event A is convolved with a kernel function. Event A can be modeled as an impulse function that is zero at all times except for a spike at the time Event A occurred. The kernel function may be any of a variety of functions, including Gaussian, uniform, triangular, etc. FIG. 2B shows various examples of Gaussian kernel functions. The Gaussian curves have a characteristic symmetric "bell curve" shape that falls off on either side of the maximum. These Gaussian functions have varying amounts of "spread" in the width of the "bell." For higher dimension problems, the kernel is also in higher dimensions.

Figure 2C:
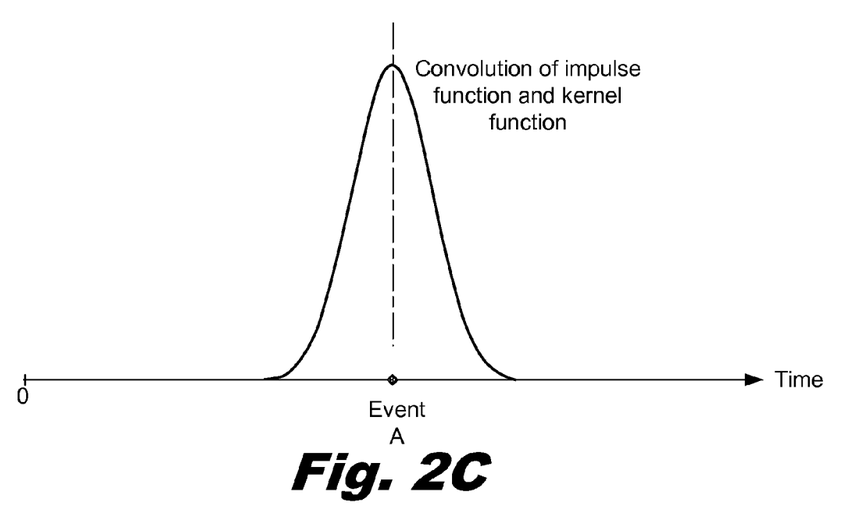

FIG. 2C shows an impulse function representing event A convolved with a Gaussian kernel function. Convolution is a mathematical operation in which the two functions being convolved produce a third function that represents the area overlap between the two functions as one of the original functions is translated. Because the convolution in this example is between an impulse function and a continuous, well-defined, kernel function, the convolution appears to be simply the kernel function. In this example, the convolved function has been defined to have one unit area under the curve. However, other functions could be selected to represent the event.

Figure 3A:
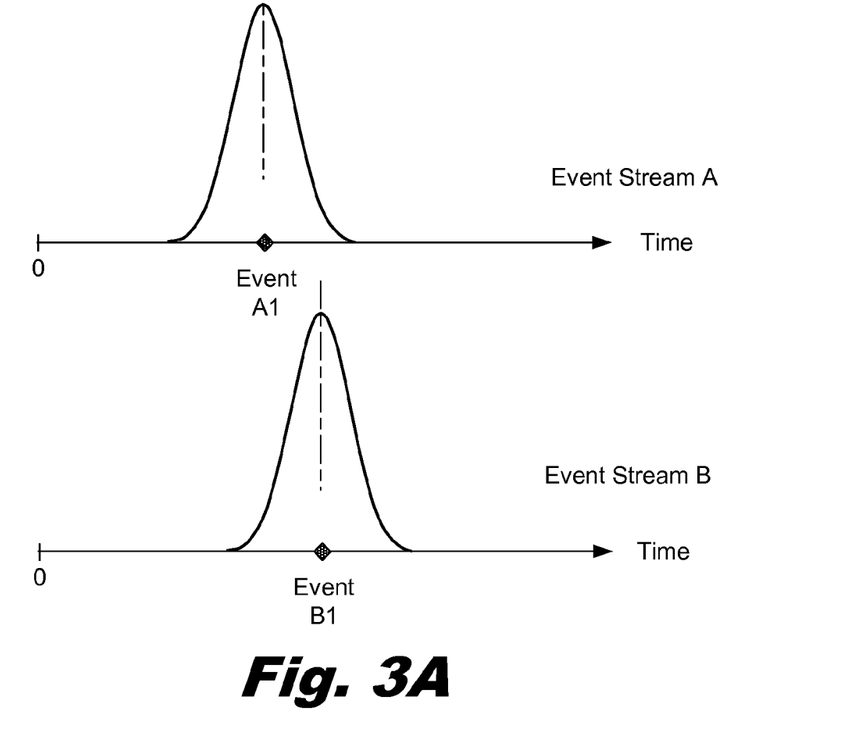
FIGS. 3A-3D are graphs of various convolved functions, according to one example of principles described herein.
Figure 3B:
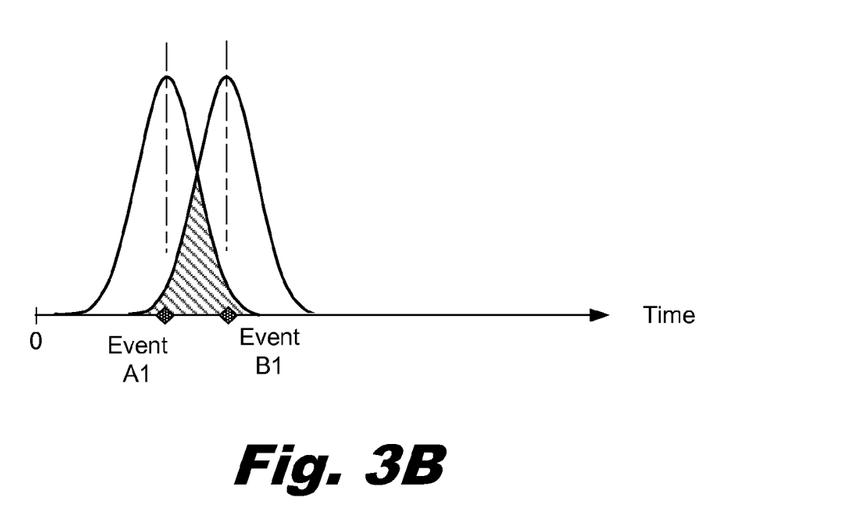

FIGS. 3A-3B are graphs of convolutions of events in two different event streams and overlap between the two convolutions. As discussed above the event correlator receives events from multiple streams. In this example, the event correlator receives both event streams A and event streams B. The event correlator convolves each event in the event streams with kernel functions. The kernel function may or may not be the same for all of event streams. For example, one event stream may have characteristics that are best described using a uniform kernel function while another event stream may be best represented by a triangular kernel function.

In FIG. 3A, the events are convolved with the same Gaussian function. FIG. 3B shows the show the two overlapping functions. The common area under the curve represents the co-occurrence between the two events. The amount of co-occurrence can be quantified by determining the amount of overlapping area under the two curves. For example, if the events occur at identical times, the overlapping area would be the total area under the curve which is the unit area.

By changing the type of kernel function or adjusting the shape of a particular type of kernel function, the shape of the convolved function can be adjusted. For example, if it is desirable to determine co-occurrence of events that are farther apart in time, Gaussian kernel functions could be selected that have lower peaks and fall off more slowly. For example, both the of the kernel functions represented by the dashed lines in FIG. 2B fall off more slowly than the kernel function convolved with the events in FIG. 3A. However, regardless of the type of kernel function selected, the area under the curve for a given convolved function can be normalized to 1.

In FIG. 3B, the area of overlap (shown by the filled area) between the two curves is approximately ⅓ of a unit area. Thus, event A1 and event B1 can be said to have co-occurred. The co-occurrence can be quantified as ⅓ since each of the events has an area under of the curve of 1.

Figure 3C:
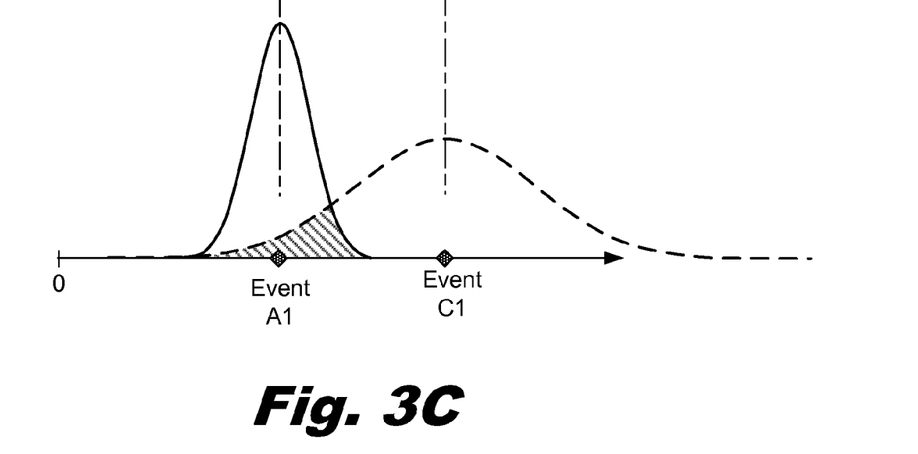

FIG. 3C shows convolutions of events (A1, C1) of two different event types. The convolved curve associated with event C1 has significantly more spread than the curve associated with event A1. The difference between the two curves is a result of: 1) a different function being used to represent the two events and/or 2) different kernel functions being convolved with the functions being used to represent the events. For example, the two events A1, C1 may be represented by the same impulse function. However, two different Gaussian kernel functions were used. A narrow Gaussian function was convolved with the impulse function of the event A1 and a wider Gaussian function was convolved with the impulse function of event C1. This spreads the influence of the event C1 over a greater length of time. The spread (as well as other characteristics of the function) can be selected for the function to represent real characteristics of the event.

Figure 3D:
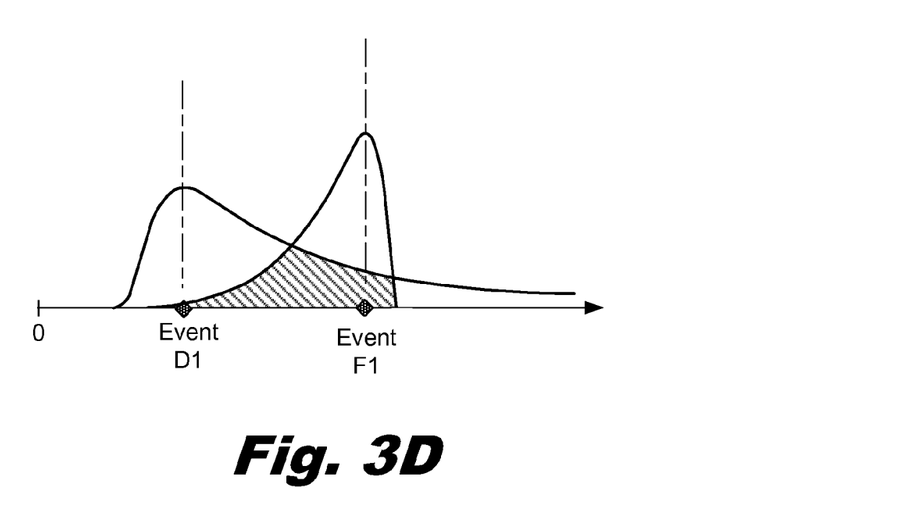

FIG. 3D shows co-occurrence of two events, D1 and F1, which have significant overlap of their convolved functions. Event D1 is an event that has been modeled as having a significant amount of correlation with events that occur after event D1, but much less correlation with events that occur before D1. For example, if event stream D is a time line of press releases by a publicly traded company, it would be expected events prior to the date of the press release D1 may have less correlation with the press release than events that occur after the press release. Thus, the function representing the event D1 and the kernel function it is convolved with can be selected to produce an approximation of the expected influence ("correlation" or "co-occurrence") the event D1 has on other events.

Similarly, the functions for event F1 can be selected to represent its interaction with surrounding events. For example, event F1 may be a 10% increase in the stock price of the publicly traded company. In this example, it is expected that events preceding 10% stock price increases would have more significant correlation than with the occurrence of the stock price increase than events following the stock price increase. Consequently, the event function and kernel function are selected so that the curve representing event F1 exhibits the desired distribution.

Figure 4A:
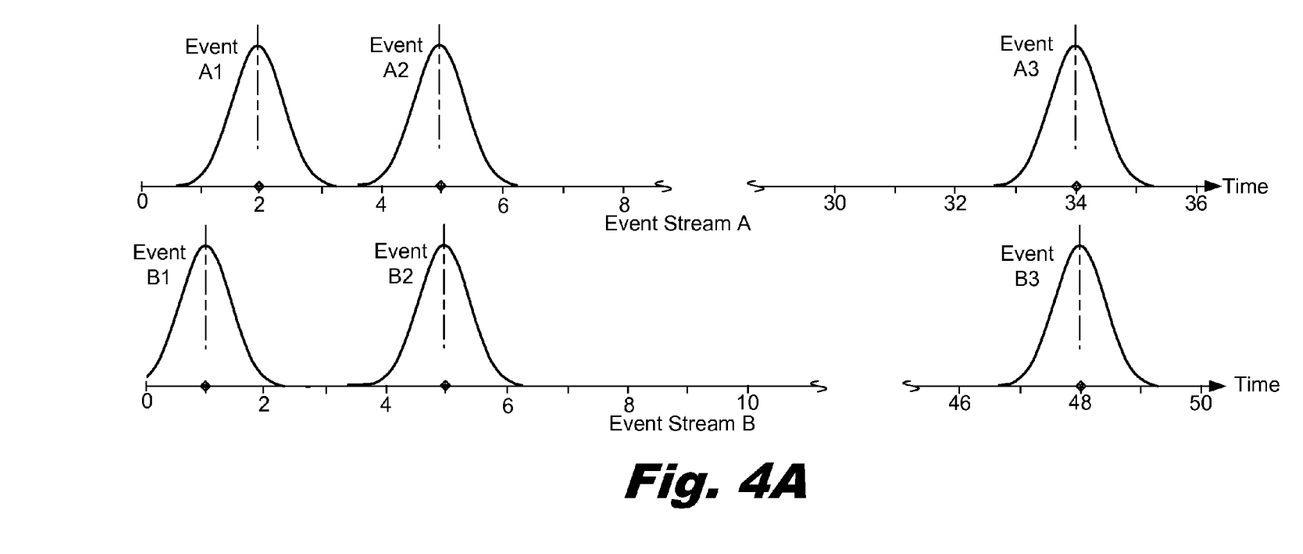
FIGS. 4A-4B are graphs of convolved functions of multiple events in two different event streams and overlap between the convolved functions, according to one example of principles described herein.
Figure 4B:
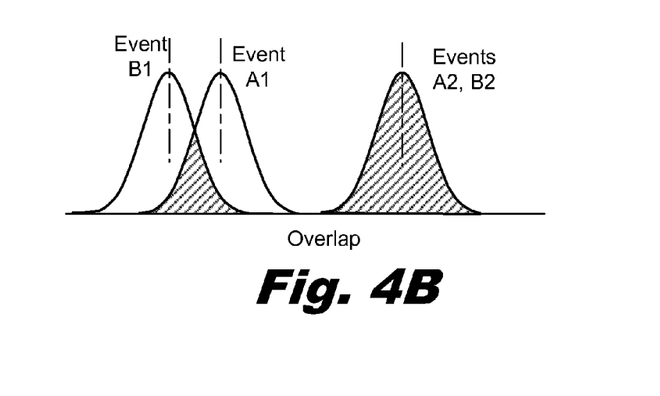

FIGS. 4A-4B are graphs of convolutions of multiple events in two different event streams and correlations between the events. FIG. 4A shows time lines of multiple events arranged in two different event streams. In event stream A, event A1 occurs at time 2, event A2 occurs at time 5, and event A3 occurs at time 34. In event stream B, event B1 occurs at time 1, event B2 occurs at time 5, and event B3 occurs at time 48. In this example, all the events have been represented by impulse functions convolved with the same Gaussian function.

FIG. 4B shows the amount of overlap between events in the event A stream and events in event B stream. In this case, there is partial overlap between events B1 and A1 (approximately ⅓) and complete over lap between events A2 and B2. There is no overlap between event A3 and B3. The overlapping instances can be analyzed in a variety of ways, including adding the areas of the overlapping instances together. Thus, the co-occurrence between the A events and B events can be quantified as approximately 1.3 area units.

FIGS. 4A and 4B show only two event streams. However, the principles described herein can be applied to any of a number of event streams to determine co-occurrences between the various events.

In one implementation, the event streams are captured and the occurrence of every relevant event type is arranged on a single time line. For example, events A ($E_A$) occur at time T={1, 5, 34 . . . }. Let this series for event $E_i$ be denoted as $P_{Ei}$.

For every event type $E_i$, a kernel density function $K(E_i)$ is defined. Different event types can have different kernel functions. Some of the kernels of interest are: Gaussian, uniform, triangular, etc.

For each event type, the series $P_{Ei}$ is convolved with $K(E_i)$. This produces a new series for every event type. For event type $E_i$, the convolved functions are denoted by $Q_{Ei}$.

Co-occurrences over these $Q_{Ei}$ are defined by the amount co-occurrence between $E_i$ and $E_j$, which is defined as the common area under the curve between $Q_{Ei}$ and $Q_{Ej}$. Using the area under the curve to determine overlap has the property that the common area under the curve of event types $E_i$, $E_j$, $E_k$ is necessarily less than or equal to the common area under the curve for each of $E_i$, $E_j$ and $E_j$, $E_k$ and $E_i$, $E_k$. This property is called the a-priori property. This property dictates that if there is no common area between a first function and a second function, there is no common area between the first function, second function, and any other function. This property can be exploited to reduce the amount of computation needed to determine where overlap exists between events. For example, if there is no overlap between A and B, then it necessarily follows that A, B, and C do not mutually overlap and do not share any common area. Because of this a-priori property we can use an a-priori algorithm to find all the significant co-occurrences. For example, if A and B do not overlap, the computer implemented instructions would not attempt to discover if there is mutually common areas between A, B, C or any other combination including A and B because the a-priori principle excludes these combination from having mutual overlap.

The overlap between the curves can be used to find all significant co-occurrences and obtain co-occurrence sets and correlation rules. The term "significant" is applied to co-occurrences or correlation rules that have support and/or confidence greater than pre-specified thresholds. The term "support" is used differently than the standard definition. Support for an event $E_i$ is defined as the total area under the curve of $E_i$ divided by the total number of occurrences of all event types. Similarly, the support for the co-occurrence of events $E_i$, $E_j$ is the total common area under the curves divided by the total number of occurrences of all relevant event types. This is only one definition for support. Other definitions may be used. In general, the concept of support provides a measurement of the frequency of overlapping events have compared to the total number of events. For example, the support for co-occurrence of events A1 and B1 shown in FIGS. 4A and 4B would be approximately 1.3/6=0.22.

Confidence indicates the frequency with which data complies with a given rule. For example, for a rule $E_i \rightarrow E_j$ (the existence of event $E_i$ implies the existence of event $E_j$) the confidence can be calculated as the common area under the curves (overlapping areas between $E_j$) divided by area under the curve for $E_i$. In the example shown in FIGS. 4A and 4B, the confidence of the rule that event A implies event B is 1.3/3=0.43. There are a number variations of this definition of confidence that can be used. For example, the common area under the curves can be divided by a maximum of area under events $E_i, E_j$ rather than just $E_i$.

Thresholds can be defined for support and confidences levels. When an occurrence, series of co-occurrences, or rule has support and/or confidence levels that exceed these thresholds, the occurrence or relationship can be designated as a "significant co-occurrence" or "significant" relationship between event types over the time dimension.

Figure 5:
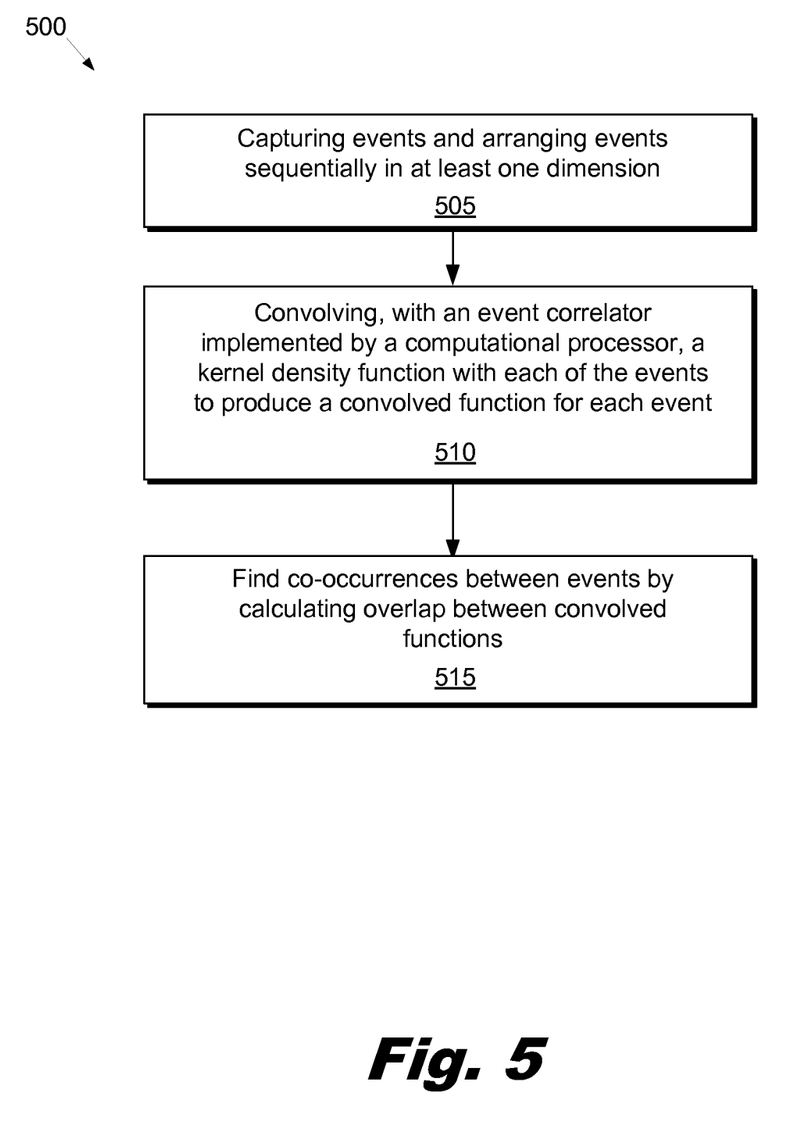
FIG. 5 is a flowchart of a method for event correlation, according to one example of principles described herein.

FIG. 5 is a flowchart of a method for event correlation by an event correlator. As discussed above with respect to FIG. 1, the event correlator is implemented by the computing device using its processor and memory. The method includes capturing events and arranging the events sequentially in at least one dimension or space (505). The dimension or space may be multidimensional. In some examples the dimension or space may be a time line. As discussed above, capturing events may include accepting multiple event types from multiple event streams.

The events are convolved with a kernel density function to produce a convolved function for each event (510). The kernel density function may be selected based on the temporal characteristics of the event or events. For example, if influence of the event is relative short lived, the kernel density function may have little temporal spread. However, if the event has (or is perceived to have) a significantly longer influence, a kernel density function with greater spread can be selected. The shape of the kernel density function can also be selected to reflect the temporal characteristics of the event.

The convolution may include assigning a function to each event and convolving the kernel density function with the assigned function. For example, the assigned function may be an impulse function centered about a time the event occurs. Different event types may be convolved with different kernel density functions.

Co-occurrences between events are found by calculating overlap between the convolved functions (515). Calculating overlap between convolved functions may include calculating the common area under curves of at least two convolved functions. In some instances, co-occurrence may be calculated for a first type or class events and a second type or class of events.

As discussed above, a support value for an event can be calculated by calculating an area under all instances of the event to produce a total area for the event and dividing this total area by the total number of occurrences of all event types to produce the support value. Support for co-occurrence between a first event type and second event type can be similarly computed by calculating a total common area under convolved functions for the first event type and second event type and then dividing the total common area by the total number of occurrences of all relevant event types. Confidence values can also be calculated. A determination can be made if the event, co-occurrences, and co-occurrence relationships are significant by comparing the support and/or confidence values to thresholds. The thresholds may be static values or may be calculated. For example, the thresholds may be calculated based on characteristics of the event streams.

These principles for event correlation have a number of advantages. The techniques described above do not use window or any other arbitrary division of a time line. Consequently, the imprecision, arbitrary pairing of events into a windows, and excess computation associated with the use of windows is avoided.

Additionally, while measuring correlation between events, the principles above provide for more weight to be given to events that occur nearer to each other than those that occur further from each other. In contrast, the windowing techniques do not make this distinction. If the events are inside the same window, they are co-occurring; if the events are outside the window, they are not co-occurring.

Further, the principles described above provide the flexibility for each event type to be treated differently by convolving different kernel functions with specific events or event types. Additionally, the principles described above provide the flexibility to find correlations based on space and space-time.

The method illustrated in FIG. 5 may also be implemented as computer readable program code stored on a computer readable medium. As used herein, a computer readable medium is physically a machine or an article of manufacture. Thus, FIG. 5 may be taken as alternatively illustrating a sequence of actions performed by a processor or computer that is executing corresponding instructions stored on a computer readable medium.

In another example of the subject matter disclosed herein, a computer readable storage medium has computer readable program code stored thereon, including: computer readable program code to receive a first type of events from a first event stream; computer readable program code to receive a second type of events from a second event stream; computer readable program code to arrange the first type of events and second type of events sequentially on a time line; computer readable program code to assign an impulse function to each event; computer readable program code to convolve a first kernel density function with the first type of events and a second kernel density function with the second type of events to produce convolved functions; and computer readable program code to find co-occurrences between events by calculating common area between at least two overlapping convolved functions.

In a further example, this compute readable storage may include computer readable program code to calculate a support value for a co-occurrence between the first type of events and the second type of events by: calculating a total common area under convolved functions for the first type of events and the second type of events; and dividing the total common area by the total number of occurrences of the first type of events and the second type of events; and computer readable program code to determine if the co-occurrence is a significant co-occurrence by comparing the support value to a threshold.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for event correlation comprising:
   capturing events including a first event and a second event and arranging the events sequentially in at least one dimension;
   convolving, with an event correlator implemented by a computational processor, a kernel density function with each of the events to produce a convolved function for each event, wherein the convolving includes:
   producing a first convolved function associated with the first event; and
   producing a second convolved function associated with the second event; and
   finding co-occurrences between events, wherein the finding of co-occurrences includes:
   calculating an area of overlap between the first convolved function and the second convolved function; and
   finding a co-occurrence between the first event and the second event based on the area of overlap.

2. The method of claim 1, in which capturing the events comprises accepting multiple event types from multiple event streams, in which events having different event types are convolved with different kernel density functions.

3. The method of claim 1, further comprising giving more weight to co-occurring events that occur closer in time than co-occurring events that occur farther apart in time.

4. The method of claim 1, in which convolving a kernel density function with each of the events comprises:
   assigning a function to each event; and
   convolving the kernel density function with the assigned function.

5. The method of claim 4, in which the kernel density function is a multidimensional kernel density function that is convolved with the assigned function.

6. The method of claim 4, in which arranging events sequentially in at least one dimension comprises arranging events on a timeline, in which the assigned function comprises an impulse function centered on a time an event occurred.

7. The method of claim 1, further comprising calculating a support value for an event by:
   calculating an area under all instances of the event to produce a total area for the event; and
   dividing the total area for the event by a total number of occurrences of all event types to produce the support value.

8. The method of claim 1, further comprising calculating a support value for a co-occurrence between a first event type and a second event type by:
   calculating a total common area under convolved functions for the first event type and the second event type; and
   dividing the total common area by a total umber of occurrences of all relevant event types.

9. The method of claim 1, further comprising calculating confidence for a co-occurrence rule between a first event type and a second event type by:
   calculating a total common area under the convolved functions of the first event type and the second event type; and
   dividing the total common area by a total area of all relevant event types.

10. The method of claim 9, further comprising comparing the confidence value to a threshold.

11. The method of claim 1, wherein an area of the first convolved function and an area of the second convolved function are normalized to a predetermined value.

12. A non-transitory computer readable storage medium having computer readable program code embodied therewith, the computer readable program code comprising:
   computer readable program code to receive a first type of events from a first event stream;
   computer readable program code to receive a second type of events from a second event stream;
   computer readable program code to arrange the first type of events and second type of events sequentially on a time line;
   computer readable program code to assign an impulse function to each event;
   computer readable program code to convolve a first kernel density function with the first type of events to produce a first convolved function associated with a first event of the first type of events;
   computer readable program code to convolve a second kernel density function with the second type of events to produce a second convolved function associated with a second event of the second type of events; and
   computer readable program code to find a measure of co-occurrence between the first event and the second event by calculating a common area between the first convolved function and the second convolved function.

13. The non-transitory computer readable storage medium of claim 12, further comprising:
   computer readable program code to calculate a support value for a co-occurrence between the first type of events and the second type of events by:
      calculating a total common area under convolved functions for the first type of events and the second type of events; and
      dividing the total common area by the total number of occurrences of the first type of events and the second type of events; and
   computer readable program code to compare the support value to a threshold.

14. A system for event correlation comprises:
   an event stream comprising a plurality of events including a first event and a second event;
   a sensor to detect the plurality of events;
   an event correlator to receive the plurality of events from the sensor, in which the event correlator is implemented by a computer processor and a memory, the event correlator comprising:
      a convolution module to convolve a kernel density function with each of the plurality of events to produce a first convolved function associated with the first event and a second convolved function associated with the second event;
      an overlap module to calculate common area between kernel density functions of the plurality of events, in which an area of overlap between the first convolved function and the second convolved function indicates co-occurrence of the first event and second event.

15. The system of claim 14, further comprising a statistics module to calculate support for the co-occurrence between the first event and second event by:
   calculating a total common area under convolved functions for the first event type and the second event type; and
   dividing the total common area by the total number of occurrences of the first event type and second event type.

* * * * *